(12) United States Patent
Ge et al.

(10) Patent No.: US 11,905,822 B2
(45) Date of Patent: Feb. 20, 2024

(54) ONLINE MEASURMENT METHOD FOR TEMPERATURE STABILITY OF PRODUCTION LAYER IN OIL AND GAS WELL, SYSTEM AND STORAGE MEDIUM

(71) Applicant: Guoxing Huijin Shenzhen Technology Co., Ltd., Shenzhen (CN)

(72) Inventors: Zhihua Ge, Shenzhen (CN); Shuai Guan, Shenzhen (CN); Chuntao Song, Shenzhen (CN); Wuhua Zhou, Shenzhen (CN); Yuehua Chen, Shenzhen (CN)

(73) Assignee: GUOXING HUIJIN SHENZHEN TECHNOLOGY CO., LTD., Shenzhen (CN)

( * ) Notice: Subject to any disclaimer, the term of this patent is extended or adjusted under 35 U.S.C. 154(b) by 521 days.

(21) Appl. No.: 17/140,156

(22) Filed: Jan. 4, 2021

(65) Prior Publication Data
US 2022/0010663 A1    Jan. 13, 2022

(30) Foreign Application Priority Data
Jul. 9, 2020  (CN) .......................... 202010657180.6

(51) Int. Cl.
*E21B 43/25*    (2006.01)
*E21B 47/07*    (2012.01)
*G06K 9/62*     (2022.01)
*G01K 11/00*    (2006.01)
*G06F 18/10*    (2023.01)

(52) U.S. Cl.
CPC ............. *E21B 47/07* (2020.05); *E21B 43/25* (2013.01); *G01K 11/00* (2013.01); *G06F 18/10* (2023.01)

(58) Field of Classification Search
None
See application file for complete search history.

(56) References Cited

U.S. PATENT DOCUMENTS

| | | | |
|---|---|---|---|
| 6,789,937 B2* | 9/2004 | Haddad ................... | E21B 47/07 374/102 |
| 8,335,406 B2* | 12/2012 | Zhou ....................... | E21B 47/07 374/161 |
| 10,690,568 B2* | 6/2020 | Shida ..................... | B65G 43/00 |
| 11,591,901 B2* | 2/2023 | Fulton ..................... | E21B 49/00 |

* cited by examiner

*Primary Examiner* — Daniel S Larkin

(57) ABSTRACT

An online measurement method for temperature stability of production layers in an oil and gas well includes: obtaining a plurality of temperature data at each position point of an optical fiber; according to the temperature data, calculating temperature standard deviations of each position point within a production layer at a plurality of time points; performing probability distribution statistics according to the temperature standard deviations at all position points of the production layer at a same time point, fitting a probability distribution curve according to normal distribution, and obtaining a probability density function; obtaining the temperature standard deviations corresponding to at least one value that integral values of the probability density function at all position points of the production layer at each time point is between (0, 1), generating a standard temperature deviation normal distribution probability time curve of each section of the production layer according to the temperature standard deviations.

7 Claims, 14 Drawing Sheets

ONLINE MEASURMENT METHOD FOR TEMPERATURE STABILITY OF PRODUCTION LAYER IN OIL AND GAS WELL, SYSTEM AND STORAGE MEDIUM

BACKGROUND

1. Technical Field

The present disclosure generally relates to optical fiber sensing technologies field, and especially relates to an online measurement method for temperature stability of production layers in an oil and gas well, a system and a storage medium.

2. Description of Related Art

Oil and gas well temperature profile is important data origin for analyzing bottom hole productivity distribution, a distributed optical fiber temperature measuring equipment (DTS) can be used to capture temperature profiles of an entire oil and gas well by an optical fiber passing through the oil and gas well.

The process of using the DTS to measure the temperature profile of oil and gas wells so as to analyze states of the down-hole production layer usually goes through several stages of the production operation process:
1. shutting down the well and waiting for temperature to be stabilized;
2. opening the well and operating the well at a low flow, waiting for productivity and temperature to be stabilized;
3. switching to a high flow and continuing working, waiting for productivity and temperature to be stabilized;
4. shutting down the well and waiting for temperature to be stabilized; and
5. finishing the measurement process and resuming a normal production process.

In the above stages, before performing a next operation process, it is to wait for the temperature to be stabilized. For different oil and gas wells, productivity, a production life, and geological conditions can affect a time required for stabilizing the temperature. A current measurement process is based on empirical data to determine the time needed to wait for the temperature to be stabilized, for example, a shut-in time of the stage 1 and the stage 4 waited for the temperature to be stabilized is generally estimated to be more than 48 hours, which can't be to accurately judge whether the temperature in oil and gas wells is stable or not. If the waiting time is not enough, the temperature can't be stabilized fully, there will be interference to subsequent data analysis. On the contrary, if the waiting time is too long, it will cause capacity loss for production.

Therefore, the conventional technology is needed to be improved.

SUMMARY

The technical problems to be solved: in view of the shortcomings of the related art, the present disclosure provides an online measurement method for temperature stability of production layers in oil and gas wells, a system and a storage medium, which can calculate a temperature trend while collecting temperature data of oil and gas wells, so as to accurately judge whether the temperature in the oil and gas wells is stable to further help production.

To achieve the above purposes, the following technical scheme is adopted:

an online measurement method for temperature stability of production layers in an oil and gas well includes the following steps:
S10, obtaining a plurality of temperature data over time at each position point of an optical fiber;
S20, according to the plurality of temperature data, calculating temperature standard deviations of each position point within a production layer of oil and gas wells at a plurality of time points within a preset time period;
S30, performing probability distributions statistics according to the temperature standard deviations at all position points of the production layer at a time point, according to normal distribution, fitting a probability distribution curve of the temperature standard deviations at all position points of the production layer at the time point, and obtaining a probability density function according to the fitted curve;
S40, according to the probability density function, calculating the temperature standard deviations corresponding to at least one value that integral values of the probability density function is between (0, 1); and
S50, repeating the steps S30-S40 to obtain the temperature standard deviations corresponding to the at least one value that the integral values of the probability density function of the temperature standard deviations at all position points of the production layer at each time point is between (0, 1), segmenting all the position points of the production layer, and generating a standard temperature deviation normal distribution probability time curve of each section of the production layer according to the temperature standard deviations.

Wherein a plurality of temperature data at each position point of an optical fiber is obtained by extracting online according to a temperature profile curve measured by a distributed optical fiber temperature measuring equipment.

Wherein after the step S50, the method further includes the following step:
S60, judging whether a temperature of each section of the production layer is stable, according to the standard temperature deviation normal distribution probability time curve of each section of the production layer; if the temperature of each section of the production layer is unstable, repeating the steps S10-S50; if the temperature of each section of the production layer is stable, ending the current production operation and entering a next production operation.

Wherein, the step of according to the plurality of temperature data, calculating temperature standard deviations of each position point within a production layer of oil and gas wells at a plurality of time points within a preset time period, includes the following steps:
S201, collecting temperature data of one frame of the optical fiber every N seconds by the distributed optical fiber temperature measuring equipment, after collecting data of M frames cumulatively, performing standard deviation calculation on the temperature data at each position point of the optical fiber to obtain standard deviation data of a first frame;
S202, after collecting data of a (M+1)-th frame, performing standard deviation calculation on the temperature data at each position point of the optical fiber to obtain standard deviation data of a second frame, by using data of the last (M−1) frames in a previous M frames and the data of the (M+1)-th frame;

S203, performing the step S202 circularly, summarizing the standard deviation data of all frames in the present time period into a frame array of the standard deviation data; and S204, independently extracting data of the production layer in the generated standard deviation data frame array, to obtain the temperature standard deviations of each position point in the production layer of the oil and gas well at the plurality of time points in the present time period, and generating a standard deviation change curve according to the temperature standard deviations.

Wherein the fitted curve of the normal distribution is automatically fitted by fitting software.

A system according to an embodiment of the present disclosure includes a memory, a processor and computer programs stored in the memory and performed by the processor to implement the online measurement method above mentioned.

A computer readable storage medium according to an embodiment of the present disclosure is configured to store computer programs, the computer programs performed by a processor to implement the temperature measuring method above mentioned.

The online measurement method for temperature stability of production layers in an oil and gas well of the present disclosure is provided that, by online obtaining the plurality of temperature data over time at each position point of the optical fiber, and then calculating temperature standard deviations at each position of the production layer to express a trend of the temperature standard deviations by a normal distribution probability time curve; in this way, operators of oil and gas wells can accurately judge whether a temperature state of oil and gas wells in a current operating process is stable according to the curve, so as to confirm whether to proceed to a next operation process, and further to ensure that production can be normal and efficient.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

Figure 1:
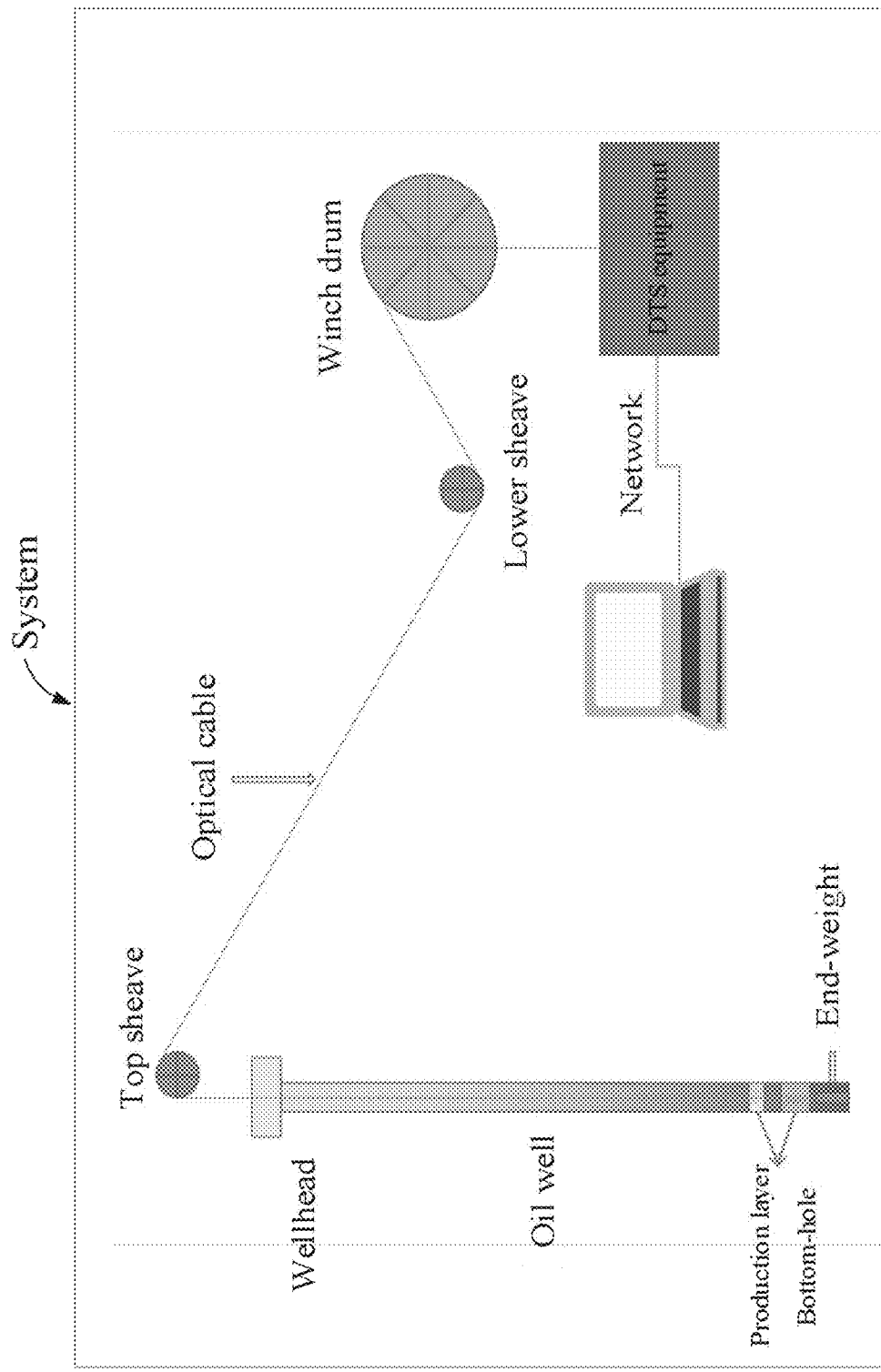
FIG. 1 is a schematic diagram of an application system of an online measurement method for temperature stability of production layers in an oil and gas well of the present disclosure.

FIG. 1 illustrates a schematic diagram of an application system of an online measurement method for temperature stability of production layers in an oil and gas well of the present disclosure. The system includes a distributed optical fiber temperature measuring equipment (DTS), an optical cable connected to the distributed optical fiber temperature measuring equipment and extended into the oil well, an optical fiber inside the optical cable is surrounded by a protective layer to protect the optical fiber. The optical cable is rotated on a lower sheave and a top sheave by a winch, so as to extend into the oil well or extend out of the oil well. The distributed optical fiber temperature measuring equipment is connected with a computer by a network to realize configuration analysis of data.

Figure 2:
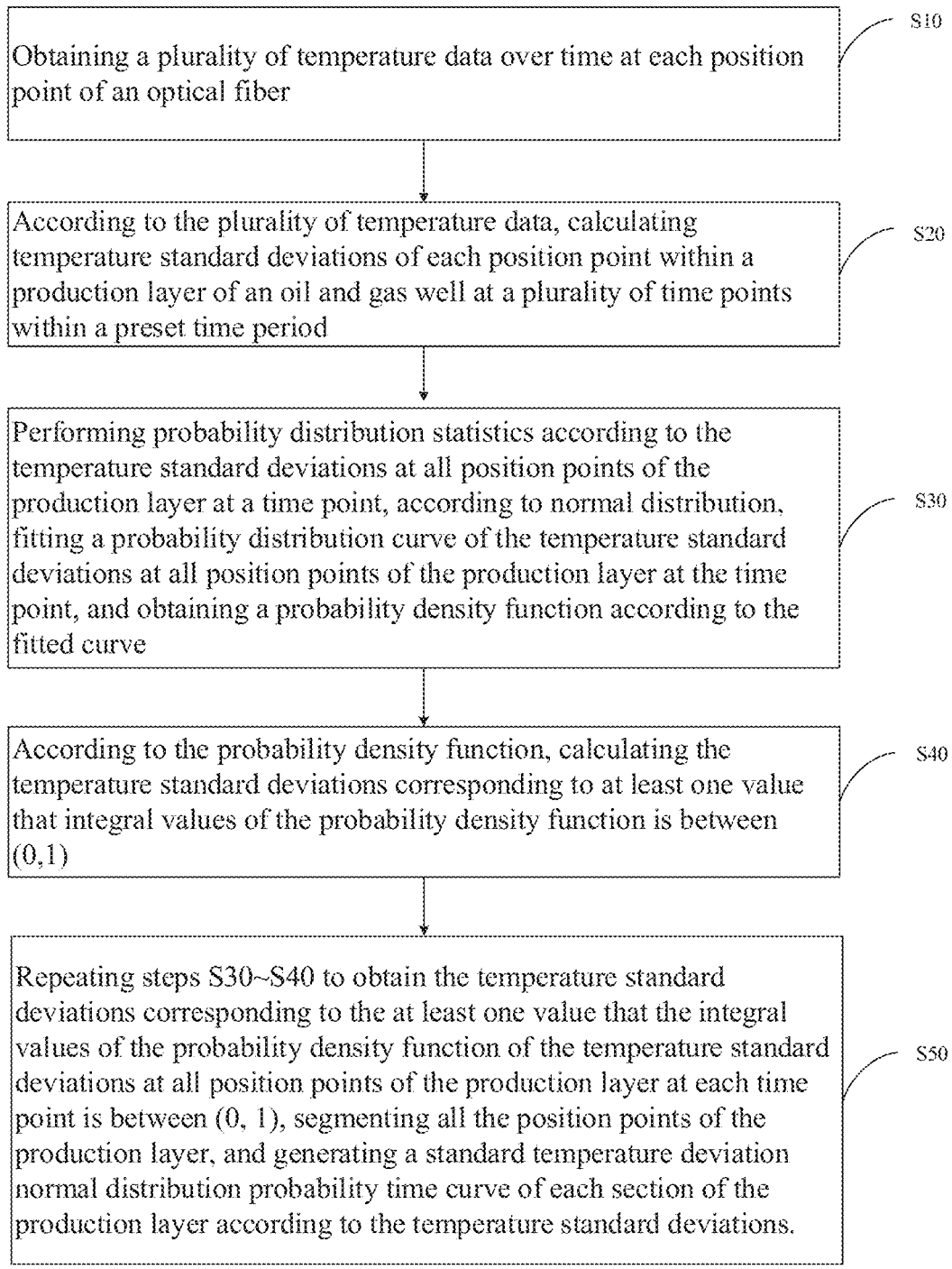
FIG. 2 is a flowchart of an online measurement method for temperature stability of production layers in an oil and gas well in accordance with a first embodiment of the present disclosure.

FIG. 2 illustrates a flowchart of the online measurement method for temperature stability of production layers in the oil and gas well in accordance with an embodiment of the present disclosure. The method includes the following steps:

S10, obtaining a plurality of temperature data over time at each position point of the optical fiber.

Figure 3:
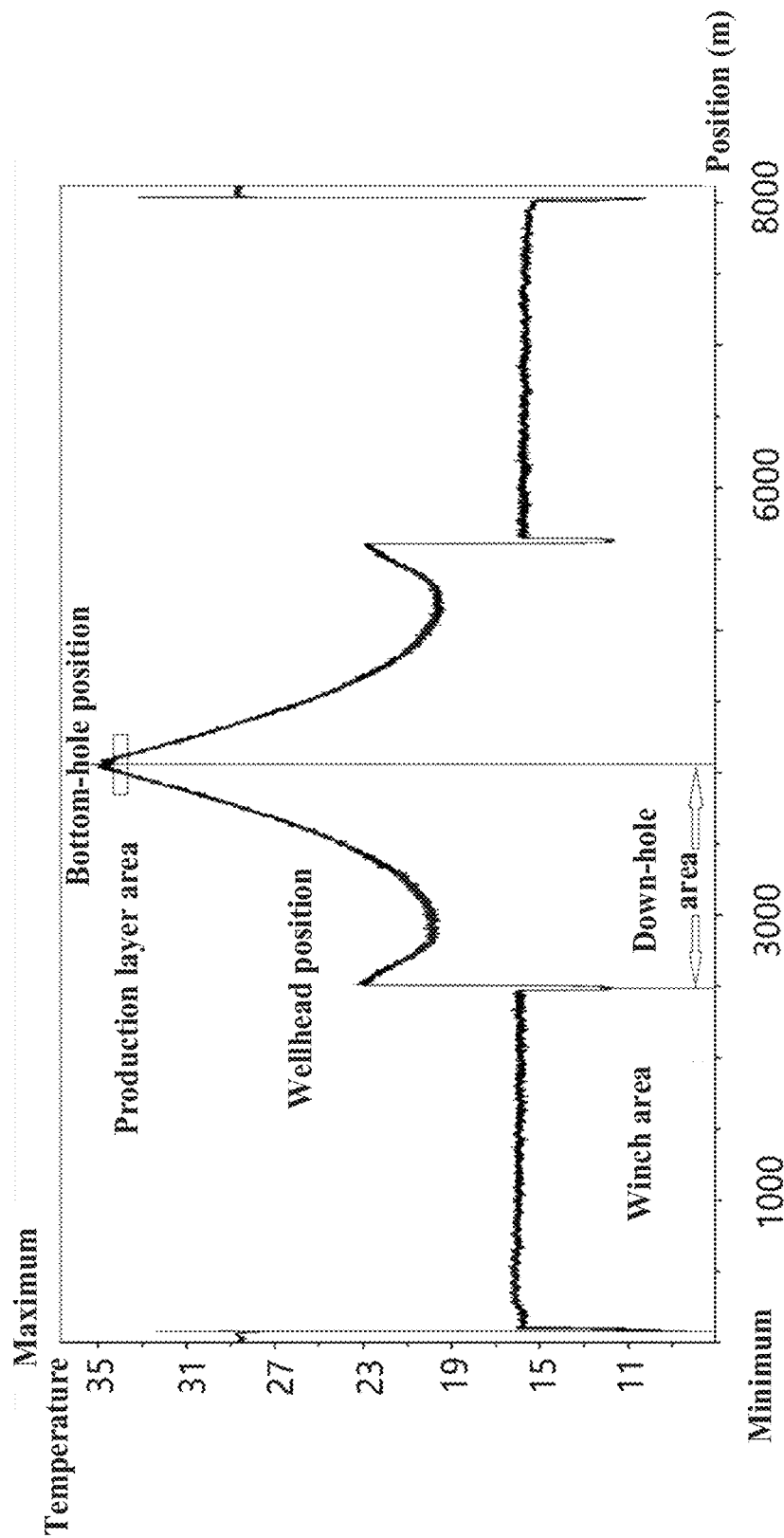
FIG. 3 is a profile schematic diagram of temperature data collected by the optical fiber of the present disclosure.

Referring to FIG. 3, the temperature data on the optical fiber includes temperatures in a winch area and in a downhole area, which in turn includes the temperatures respectively in a wellhead, a bottom-hole and a production layer area.

The temperature stability measurement of the production layer can be performed throughout the production layer or within a portion of the production layer, and can be determined according to a thickness of the production layer.

Preferably, obtaining the plurality of temperature data over time at each position point of the optical fiber of the present disclosure can be extracted online according to a temperature profile curve measured by the distributed optical fiber temperature measuring equipment. FIG. 3 is shown the temperature profile curve measured by the distributed optical fiber temperature measuring equipment, and then the temperature data of a certain region is extracted according to the curve.

Figure 4:
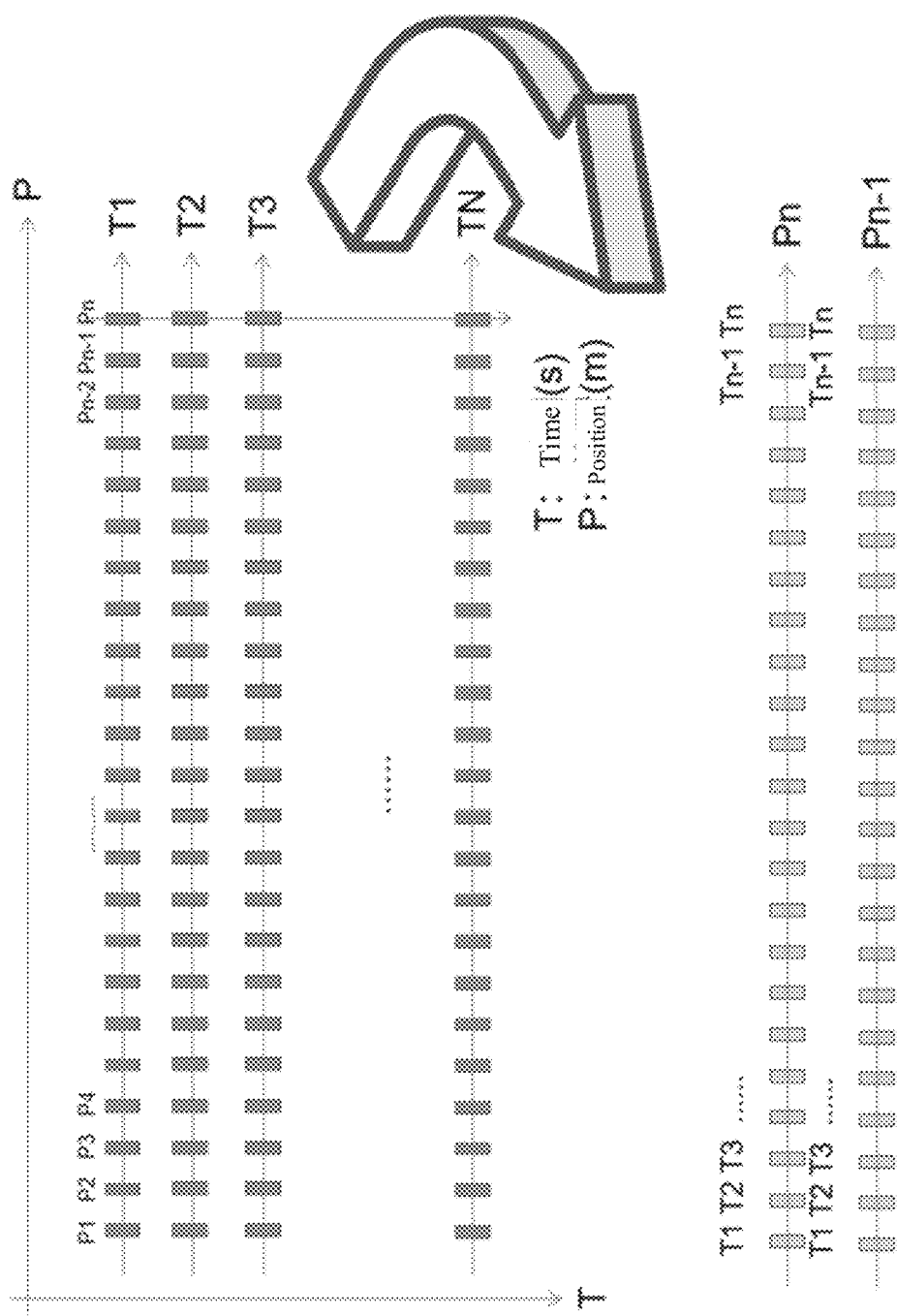
FIG. 4 is a schematic diagram of a relation between positions and times of extracting temperature data of the production layer of the present disclosure.

Referring to FIG. 4, it is that the plurality of temperature data over time at each position point of the optical fiber is extracted. Position points on the optical fiber are respectively shown as $P_1, P_2, P_3 \ldots, P_n$. The temperature data extracted from each position point at a $T_1$ time of the optical fiber is a first row data; the temperature data extracted from each position point at a $T_2$ time of the optical fiber is a second row data; and so forth, the temperature data extracted from each position point at a $T_n$ time of the optical fiber is a n-th row data.

S20, according to the plurality of temperature data, calculating temperature standard deviations of each position point within a production layer of oil and gas wells at a plurality of time points within a preset time period.

Figure 5:
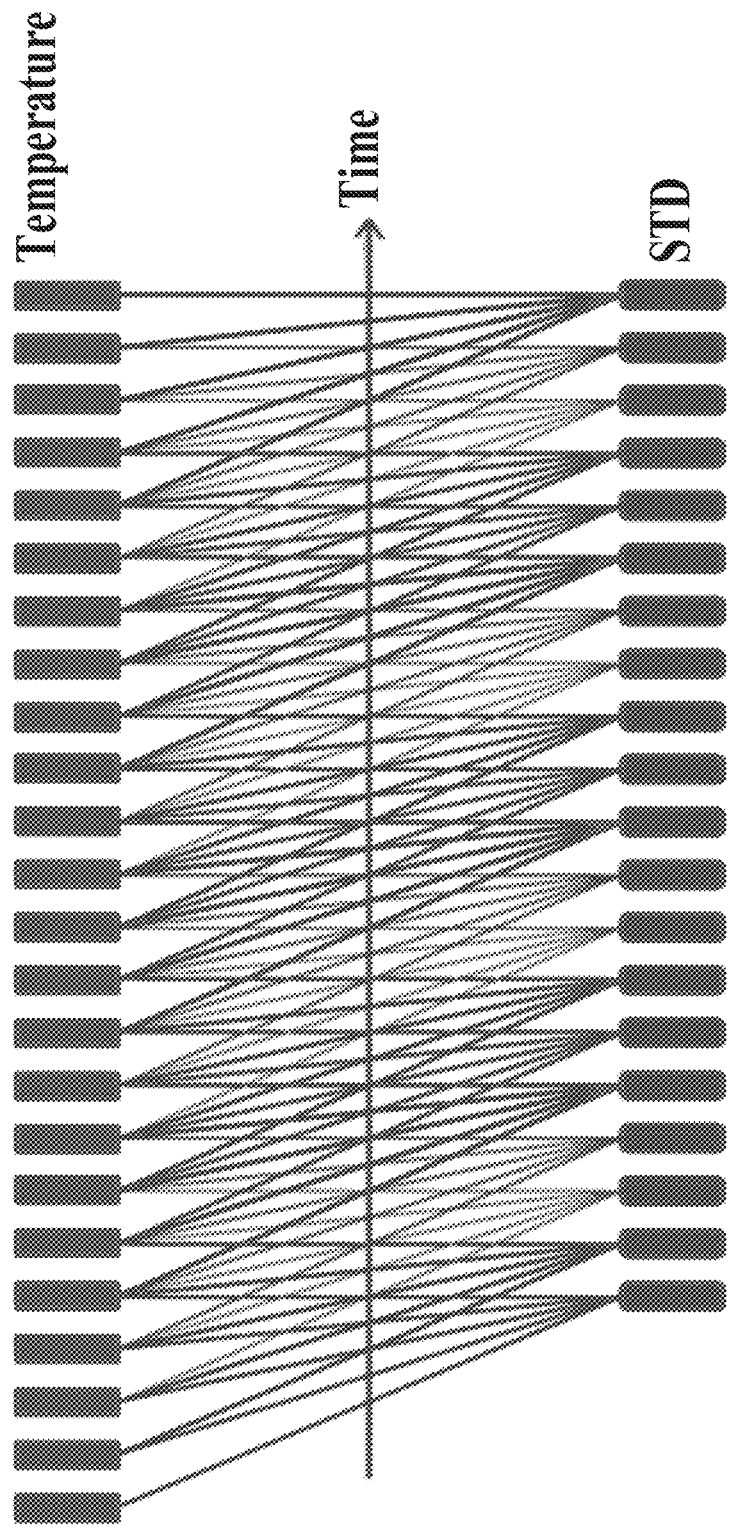
FIG. 5 is a schematic diagram of a temperature STD data source at a position point of the production layer of the present disclosure.

Calculating the temperature standard deviation (STD) of a certain position point is performed calculation the standard deviations of the position point within the preset time period, such as every 15 minutes, on a collection of all temperature data at the position point, as shown in FIG. 5. For example, if 5 data are collected from the position point within 15 minutes, then the temperature standard deviation within the 15 minutes can be calculated using the 5 temperature data. The temperature standard deviation data of this position point is reflected a temperature change trend of this position point.

Since the temperature data is collected online in real time, the temperature data can be increased with the passage of time, so the preset time period will also move forward dynamically with the passage of time. Normally, data of each frame is taken 30 seconds to be collected, and the standard deviation is usually calculated by using historical data of 30 frames, that is, a first standard deviation data is calculated starting at 15 minutes. Then the timing is started from a time of data collection of a second frame, until the end of data collection of a 31-th frame, a second standard deviation data is calculated at the end of data collection of the 31-th frame, which is also 15 minutes. As shown in FIG. 5, a plurality of temperature standard deviation (STD) data can be calculated from this position point. Understandably, a time of data collection per frame is not limited to a 30-second interval.

Figure 6:
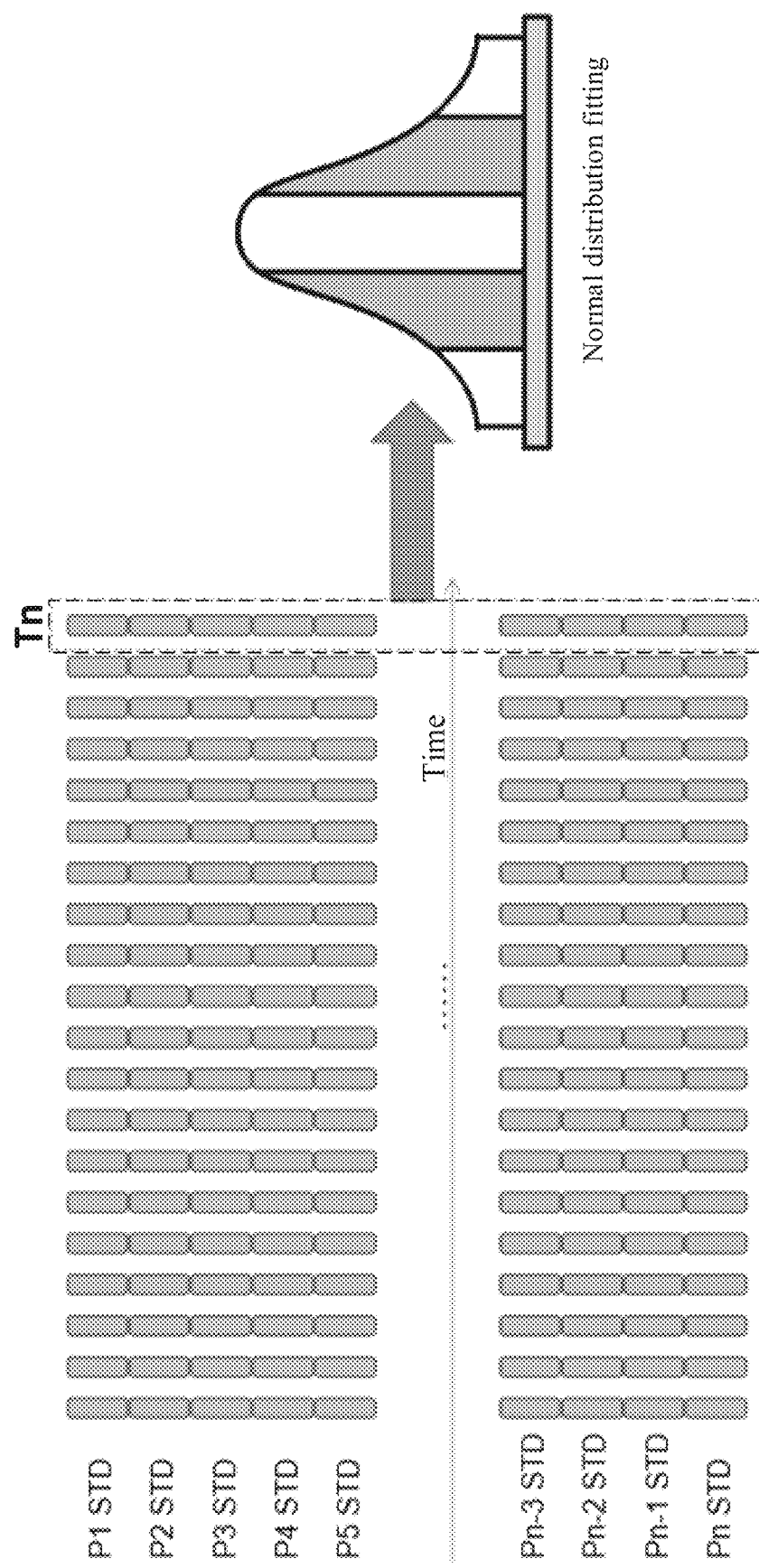
FIG. 6 is a schematic diagram of the temperature STD calculated at each position point of the production layer over time of the present disclosure.

For each position point of the production layer, the temperature standard deviation data obtained with the passage of time are calculated separately, and then the temperature standard deviation array of each position point can be obtained, as shown in FIG. 6.

S30, performing probability distributions statistics according to the temperature standard deviations at all position points of the production layer at a time point, according to normal distribution, fitting a probability distribution curve of the temperature standard deviations at all position points of the production layer at the time point, and obtaining a probability density function according to the fitted curve.

Figure 7:
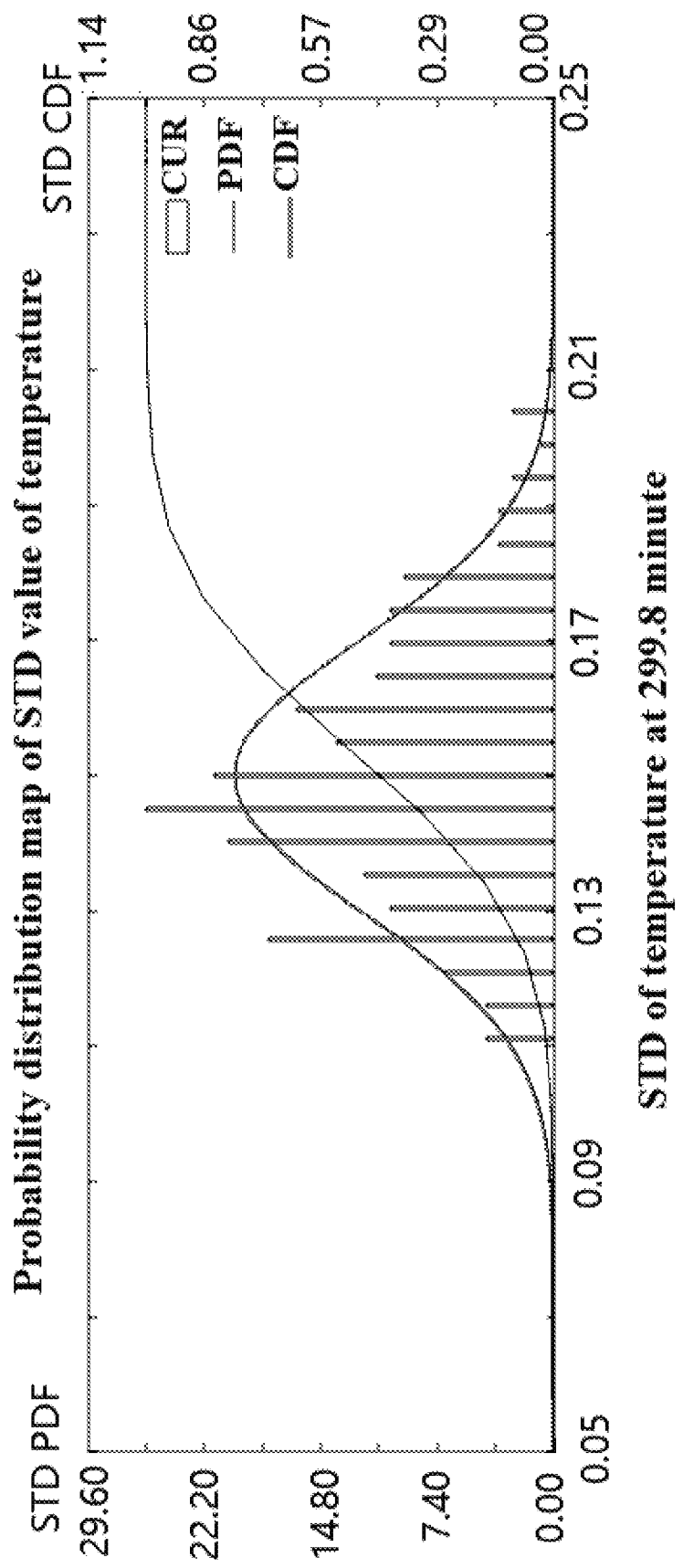
FIG. 7 is a probability distribution schematic diagram of temperature STD values at each position point of the production layer at a certain time point of the present disclosure.

Continuing referring to FIG. 6, performing probability distribution statistics on values of temperature standard deviations at position points $P_1, P_2, \ldots, P_n$ at the time $T_n$, and then, according to probability statistical results, fitting a temperature standard deviation probability distribution curve at the $T_n$ time from the position point $P_1$ to the position point $P_1$ according to normal distribution, a bell curve shown in FIG. 7 is a fitted temperature standard deviation probability distribution curve according to the normal distribution, and according the fitted curve, obtaining a probability density function corresponding to the fitted curve.

$$f(x) = \frac{1}{\sigma\sqrt{2\pi}} e - \frac{(x-u)^2}{2\sigma^2} \quad (1)$$

Preferably, the fitted curve of the normal distribution of the present disclosure is automatically fitted by fitting software, for example, MATLAB software and SCILAB software. After the normal distribution curve is fitted automatically, the fitting software can be configured to automatically obtain a corresponding probability density function of the normal distribution curve.

S40, according to the probability density function, calculating the temperature standard deviations corresponding to at least one value that integral values of the probability density function is between (0, 1).

Performing integral calculation on the formula (1):

$$f(x) = \frac{1}{\sigma\sqrt{2\pi}} e - \frac{(x-u)^2}{2\sigma^2},$$

so as to obtain a distribution function, and then according the distribution function, calculating the temperature standard deviations corresponding to the at least one value that the integral values of the probability density function is between (0, 1).

Better, calculating the temperature standard deviations corresponding to the integral values of the probability density function respectively equal to 0.1, 0.5 and 0.9, according to the probability density function.

As shown in FIG. 7, a bar is represented the number of values of the standard temperature deviations in an interval, a bell curve is represented the probability distribution curve of the normal distribution, a curve on the right is represented an integral curve of the normal distribution probability density function, that is, the distribution function curve. An X-axis is represented the temperature standard deviations, a Y-axis on the left is represented a Y value of the probability distribution curve, and a Y-axis on the right is represented a Y value of the distribution function curve.

Calculating the standard temperature deviations corresponding to the integral values of the distribution function that are respectively equal to 0.1, 0.5 and 0.9, is that, values of the standard temperature deviations on the X-axis when the Y values on the right shown in FIG. 7 are respectively equal to 0.1, 0.5 and 0.9.

Two values of the standard temperature deviations are corresponding to the integral values that are respectively equal to 0.1 and 0.9, the larger the difference between the two values of the temperature standard deviations, it is indicated that a distribution range of the temperature standard deviations is very wide, and temperatures at some position points are unstable; the smaller the difference between the two values of the temperature standard deviations, the narrower the distribution range of the temperature standard deviations is, it is indicated that temperatures at all position points are basically stable.

Preferably, the standard temperature deviation corresponding to the integral value of 0.5 can also be compared with the standard temperature deviations corresponding to the integral values of 0.1 and 0.9 by calculating the probability density function. In this way, the differences of the standard temperature deviations corresponding to the integral values of 0.1, 0.5 and 0.9 are compared to make the judgment more accurate.

S50, repeating the steps S30-S40 to obtain the temperature standard deviations corresponding to the at least one value that the integral values of the probability density function of the temperature standard deviations at all position points of the production layer at each time point is between (0, 1), segmenting all the position points of the production layer, and generating a standard temperature deviation normal distribution probability time curve of each section of the production layer according to the temperature standard deviations.

Segmenting all the position points of the production layer, for example, a first production layer, a second production layer, a third production layer . . . , there are a plurality of position points in each production layer. The purpose of segmentation is to adapt to thickness variation of the production layer, and then the standard temperature deviation normal distribution probability time curve of each production layer can be obtained piecewise, so that temperature stability of the production layer can be distinguished more finely and judgment accuracy can be improved.

Figure 8:
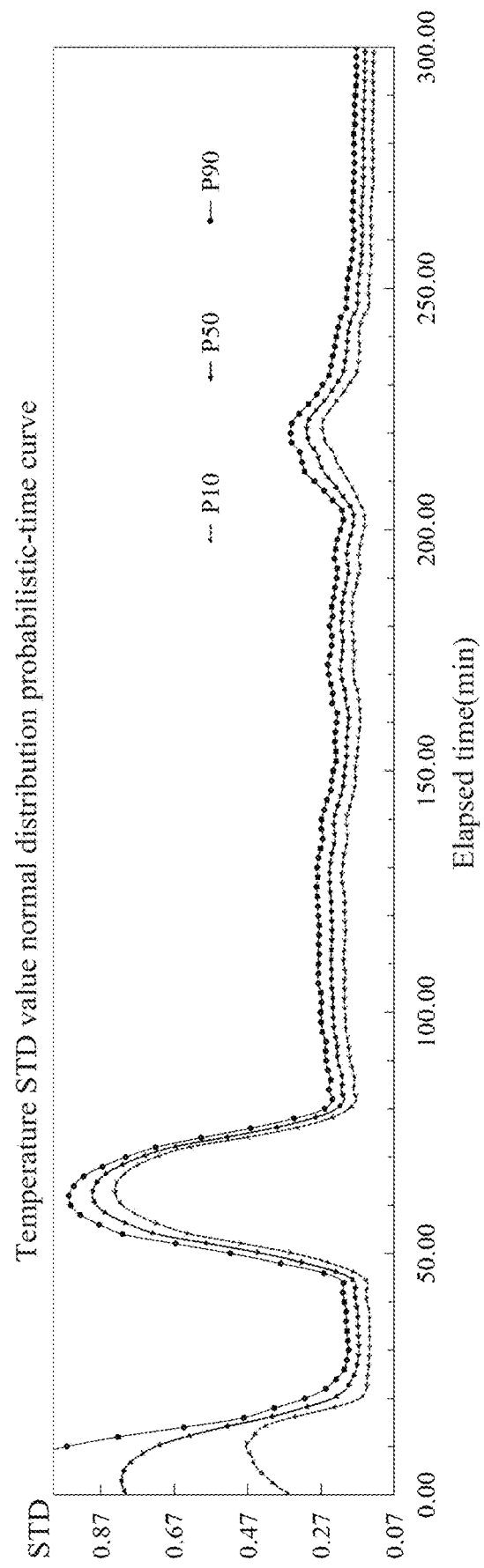
FIG. 8 is a schematic diagram of a standard temperature deviation normal distribution probability time curve at each position of the production layer of the present disclosure.

Referring to FIG. 8, when the integral values of the standard temperature deviation probability density function of all position points in the production layer at each time point is 0.1, 0.5 and 0.9 respectively, three normal distribution probability time curves are generated by the corresponding standard temperature deviations.

Figure 9:
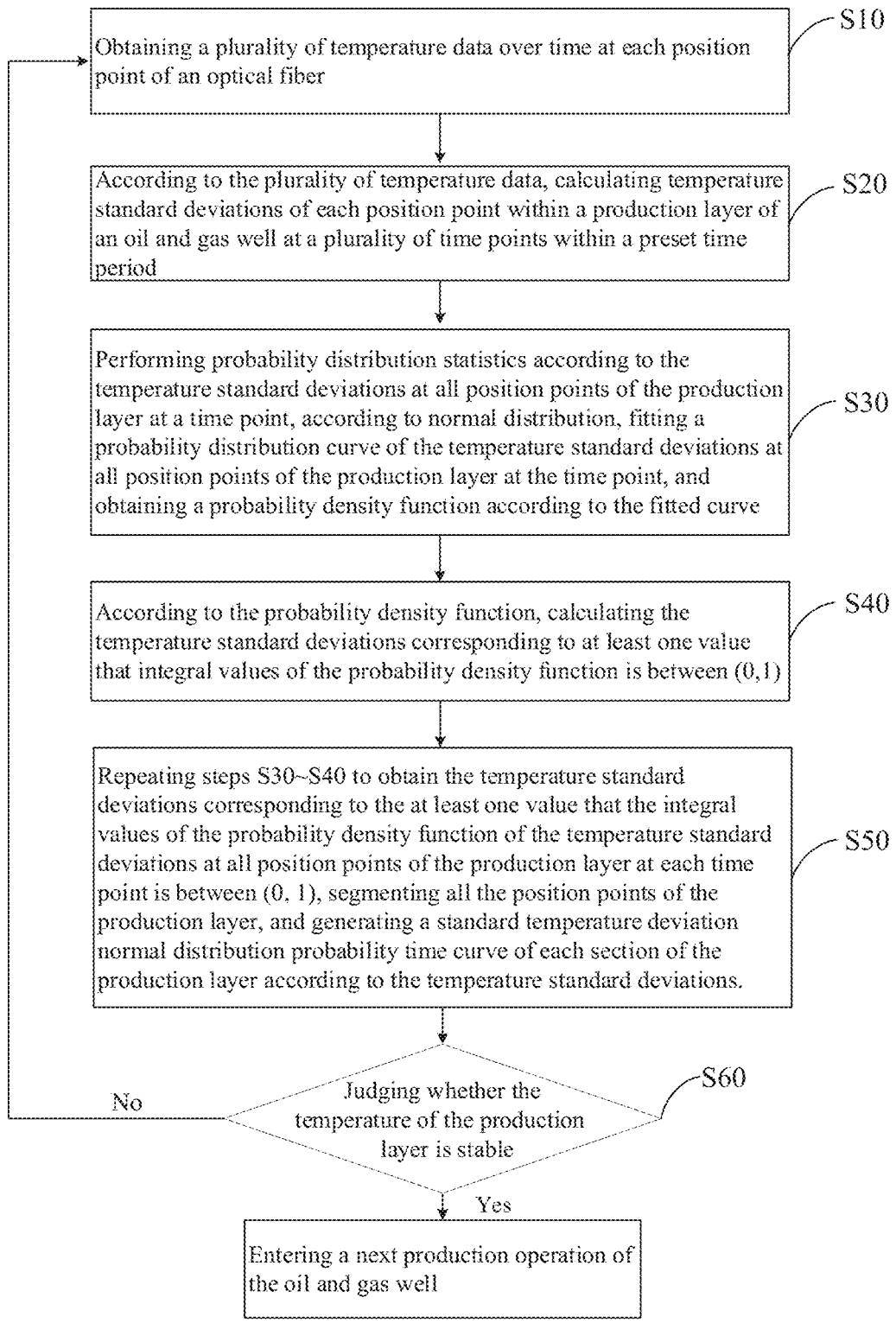
FIG. 9 is a flowchart of an online measurement method for temperature stability of production layers in an oil and gas well in accordance with a second embodiment of the present disclosure.

Furthermore, referring to FIG. 9, after the step S50, the method of the present disclosure further includes:

S60, judging whether a temperature of each section of the production layer is stable, according to the standard temperature deviation normal distribution probability time curve of each section of the production layer; if the temperature of each section of the production layer is unstable, repeating the steps S10-S50; if the temperature of each section of the production layer is stable, ending a current production operation and entering a next production operation.

The standard temperature deviation normal distribution probability time curve can be configured to reflect a temperature change trend in the production layer.

It can be seen from the standard temperature deviation normal distribution probability time curve in FIG. 8, the temperature of the production layer is changed dramatically before 149 minutes, while 179 minutes later, the temperatures are basically stable. Thus, operators of the well can proceed to a next production operation of the well after 179 minutes.

Figure 10:
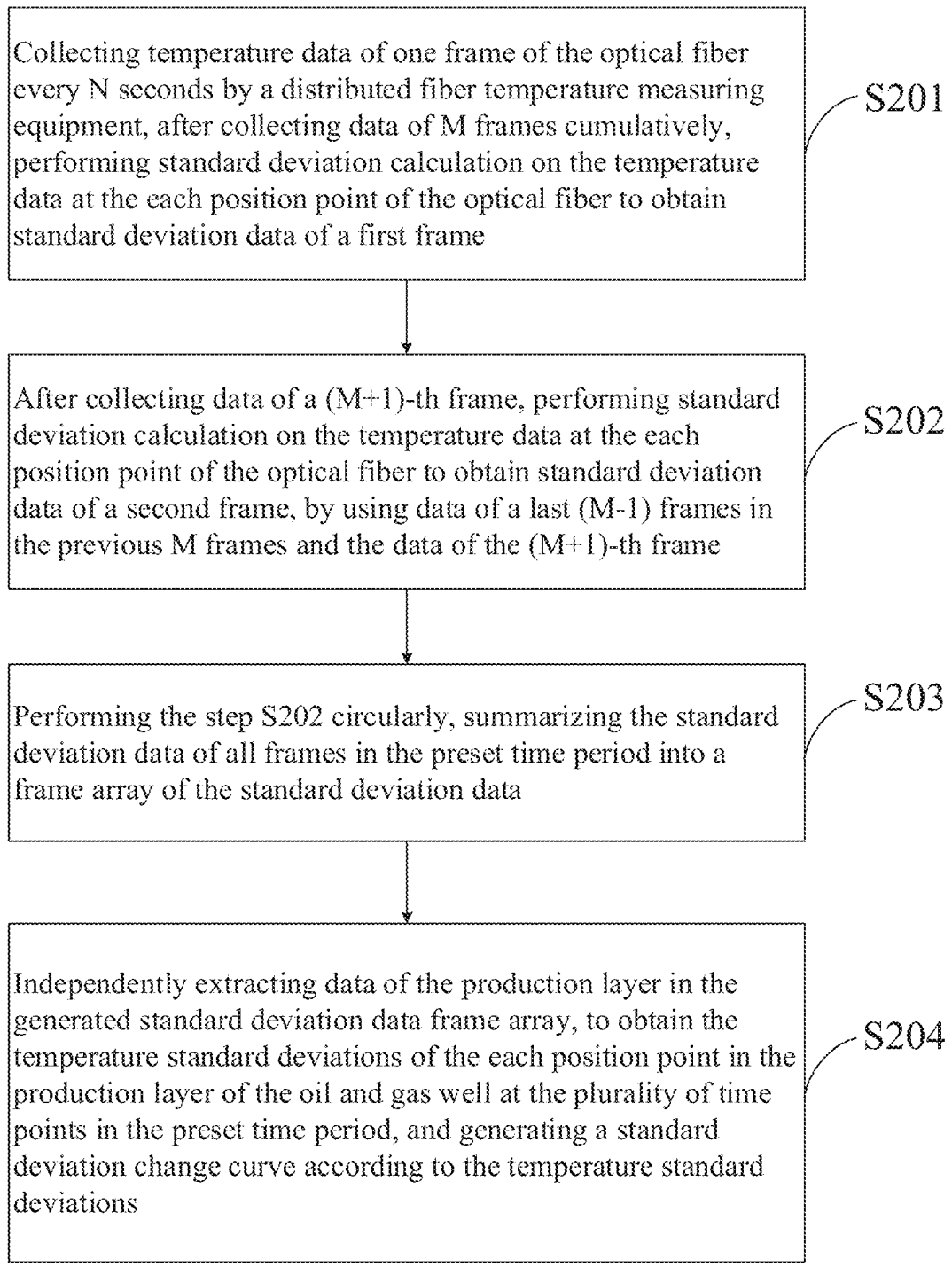
FIG. 10 is a schematic diagram of a temperature STD calculation process at a position point of the production layer of the present disclosure.

Specifically, referring to FIG. 10, the step of calculating the temperature standard deviations of each position point within the production layer of oil and gas wells at the plurality of time points within the preset time period according to the plurality of temperature data, includes the following steps:

S201, collecting temperature data of one frame of the optical fiber every N seconds by the distributed optical fiber temperature measuring equipment, after collecting data of M frames cumulatively, performing standard deviation calculation on the temperature data at each position point of the optical fiber to obtain standard deviation data of a first frame.

Figure 11:
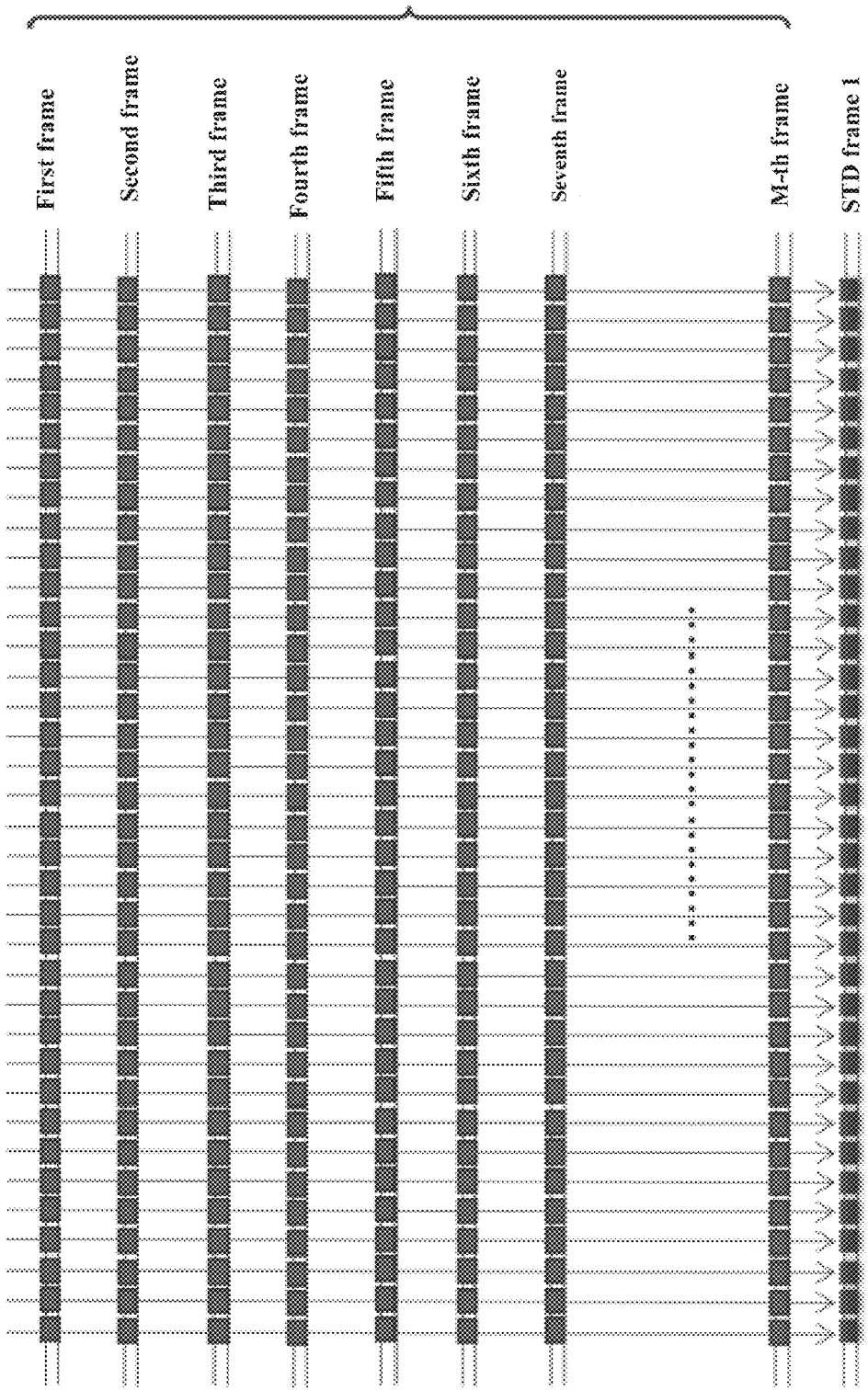
FIG. 11 is a schematic diagram of STD data source of a first frame of the present disclosure.

Referring to FIG. 11, the measurement method of the present disclosure is started to calculate the standard deviation data of the first frame after collecting data of the M frames.

As an embodiment of the present disclosure, collecting temperature data of one frame of the optical fiber every 30 seconds, and performing standard deviation calculation on the temperature data after historical data of 30 frames are accumulated. That is, starting calculating the first standard deviation at 15 minutes. It is understandable that a time of data collection per frame is not limited to the 30-second interval and a cumulative number of frames is not limited to 30 frames.

S202, after collecting data of a (M+1)-th frame, performing standard deviation calculation on the temperature data at each position point of the optical fiber to obtain standard deviation data of a second frame, by using data of the last (M−1) frames in the previous M frames and the data of the (M+1)-th frame.

Figure 12:
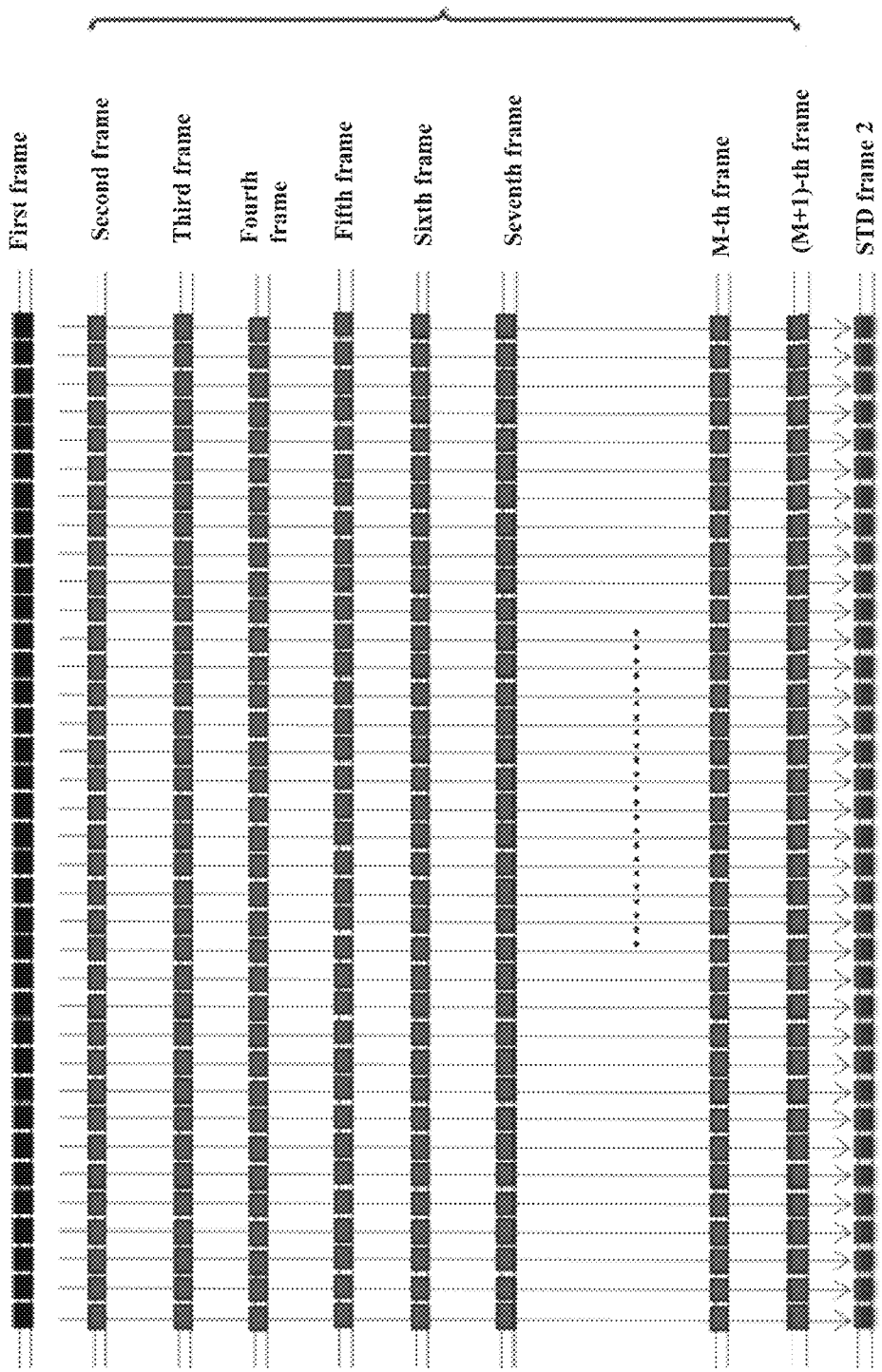
FIG. 12 is a schematic diagram of STD data source of a second frame of the present disclosure.

Referring to FIG. 12, after collecting data of the M frames, using the data from the second frame to the M-th frame in the previous data of the M frames, plus the data of the (M+1)-th frame just collected, total data of the M frames is to calculate the standard deviation data of the second frame.

S203, performing the step S202 circularly, summarizing the standard deviation data of all frames in the present time period into a frame array of the standard deviation data.

Figure 13:
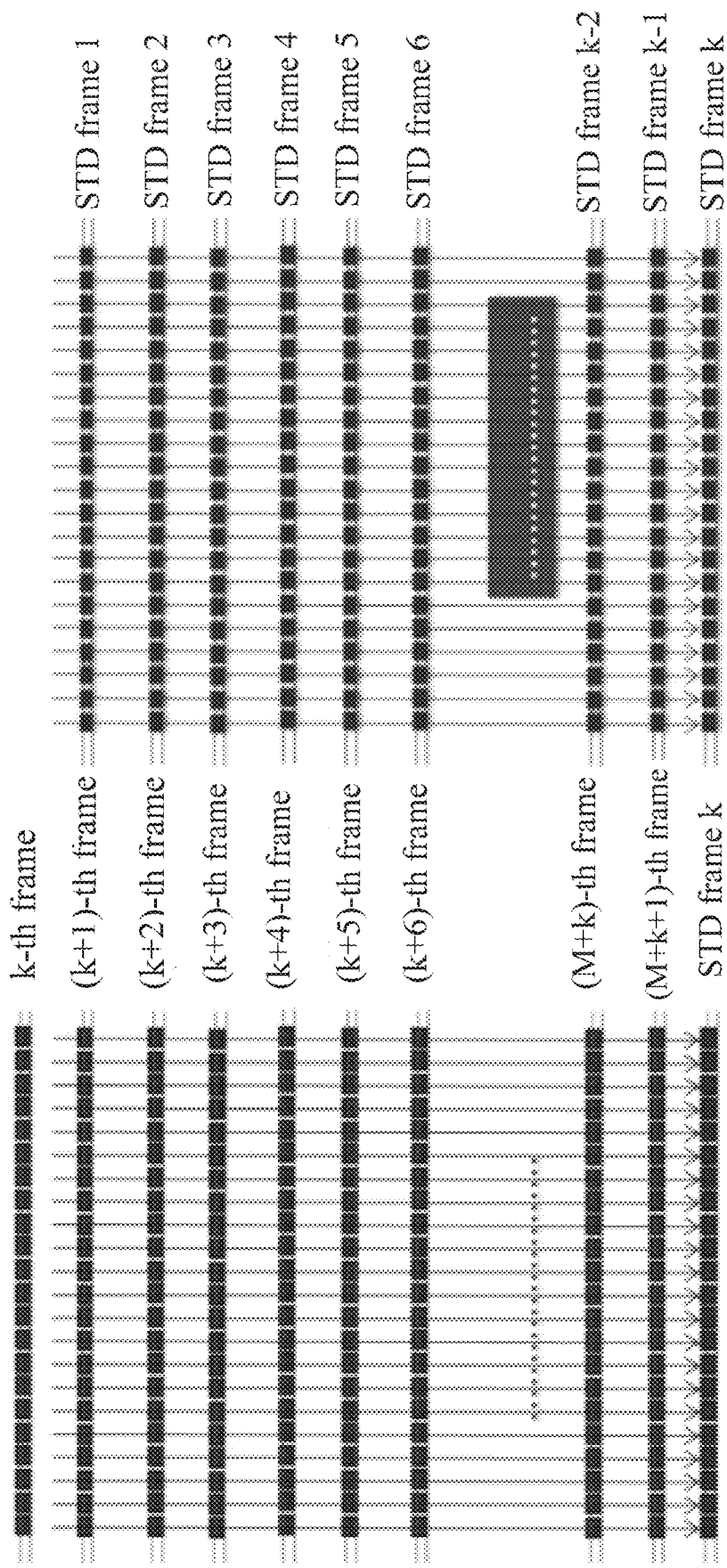
FIG. 13 is a schematic diagram of a frame array of standard deviation data obtained by temperatures of the production layer over time of the present disclosure.

Referring to FIG. 13, the standard deviation data of all frames in the preset time period, such as 60 minutes, is summarized into the frame array of the standard deviation data for subsequent calculation.

S204, independently extracting data of the production layer in the generated standard deviation data frame array, to obtain the temperature standard deviations of each position point in the production layer of the oil and gas well at the plurality of time points in the present time period, and generating a standard deviation change curve according to the temperature standard deviations.

Figure 14:
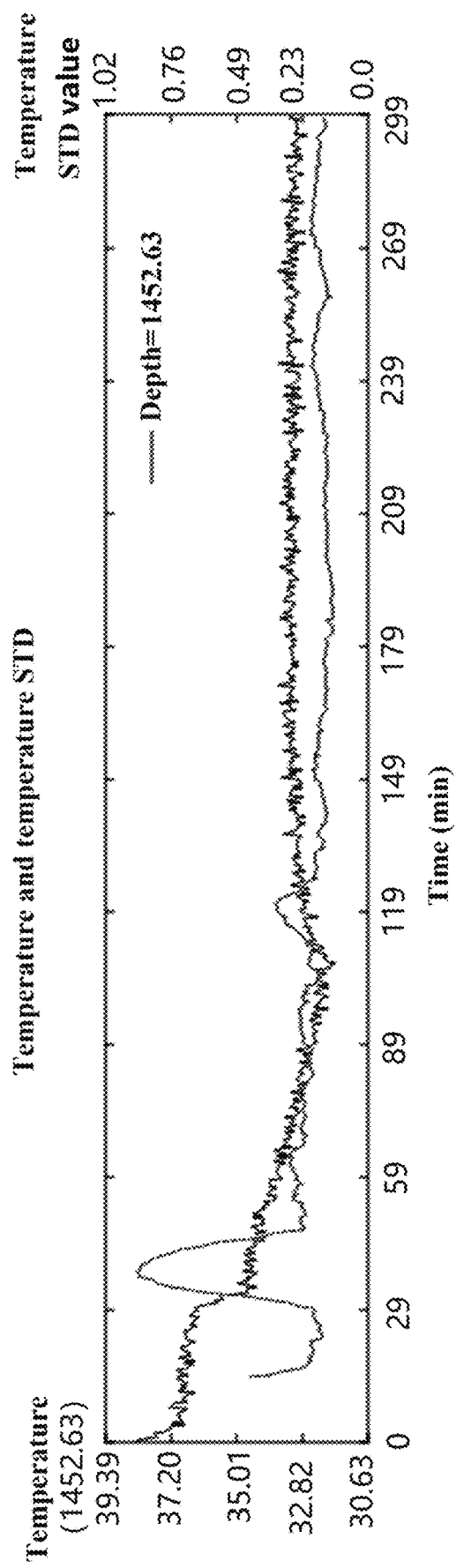
FIG. 14 is a schematic diagram of a standard deviation change curve at a certain position point of the production layer of the present disclosure.

Because the data collected from the optical fiber is the data of all segments of the oil and gas well, but the production is only needed to pay attention to the standard temperature deviation data of the production layer in the oil and gas well, therefore, it is necessary to separately extract the data located in the production layer from the above standard deviation data frame array to generate the standard temperature deviation change curve of each position point in the production layer. FIG. 14 is shown a variation curve of temperatures and standard temperature deviations over time at a depth of 1452.63 m, which can be used to reflect a temperature change trend of the position point.

The online measurement method for temperature stability of production layers in an oil and gas well of the present disclosure can be configured to measure temperature stability of multi-points or multi-areas, such method is not limited to measure the oil and gas wells by the distributed optical fiber temperature measuring equipment, but can also be applied to other fields, such as exploitation of seabed combustible ices (carbohydrate) and measurement of distributed temperature fields in other fields.

The method is not limited to temperature field measurements, but also can be applied to other kinds of distributed optical fiber sensors, such as stability field measurements of distributed stress and vibration/acoustic optical fiber sensors.

The online measurement method for temperature stability of production layers in an oil and gas well of the present disclosure is provided that, by online obtaining the plurality of temperature data over time at each position point of the optical fiber, and then calculating temperature standard deviations at each position of the production layer to express the trend of the temperature standard deviations by the normal distribution probability time curve; in this way, operators of oil and gas wells can accurately judge whether a temperature state of oil and gas wells in a current operating process is stable according to the curve, so as to confirm whether to proceed to a next operation process, and further to ensure that production can be normal and efficient.

A system according to an embodiment of the present disclosure includes a memory, a processor and computer programs stored in the memory and performed by the processor to implement the online measurement method above mentioned.

Exemplary, the computer programs can be segmented into one or more modules/units that are stored in the memory and performed by the processor, to implement the temperature measuring method of distributed multi-section optical fibers of the present disclosure. The one or more modules/units may be a series of computer program instruction segments capable of performing a specific function, which are used to describe execution of the computer program in asynchronous message processing terminal devices.

The system can include, but not limited the processor and the memory. One of ordinary skill in the related art can understand that the above components are only examples based on the system and do not constitute a qualification to the system, which can include more or fewer components than the components described above, or some combination of components, or different components. For example, the system can also include input/output devices, network access devices, buses, and so on.

The processor can be a central processing unit (CPU), or other general-purpose processors, digital signal processors (Digital Signal Processor (DSPs), Application Specific Integrated Circuits (ASICs), field-Programmable Gate Arrays (FPGAs), FPGAs or other programmable logic devices, discrete gates or transistor logic devices, discrete hardware components, etc. The general-purpose processor can be a microprocessor or the processor can be any general processors, etc. The processor is a control center of the device and connected to various parts of the entire system by various interfaces and lines.

The memory can be configured to store the computer program and/or modules, and the processor is configured to realize various functions of the device by running or executing the computer program and/or modules stored in the memory, and by calling data stored in the memory. The memory can mainly include a storage program area and a storage data area, wherein the storage program area is configured to store applications required by operating systems and at least one function (such as a sound playing function, an image playing function, etc.); the storage data area is configured to store data created based on usages (such as audio data, phone book, etc.), and so on. In addition, the memory can include a high speed random access memory, also include a non-volatile memory such as a hard disk, a internal storage, a plug-in hard disk, a smart media card (SMC), a secure digital (SD) card, a flash card, at least one disk storage device, a flash memory device, or other volatile solid state storage devices.

A computer readable storage medium according to an embodiment of the present disclosure can be configured to store computer programs, the computer programs performed by a processor to implement the temperature measuring method above mentioned.

The online measurement method for temperature stability of production layers in oil and gas well of the present disclosure is integrated with modules/units that can be stored in a computer-readable storage medium if implemented as software functional units and sold or used as stand-alone products. A specific embodiment of the computer readable storage medium is basically the same as embodiments of the online measurement method for temperature stability of production layers in oil and gas well mentioned above, which will not be repeated here.

It should be noted that the embodiments described above are only schematic examples, the units described as detached parts can or can't be physically separated, and the components displayed as units can or can't be physical units, that is, they can be located in one place, or they can be distributed over multiple network units. Some or all of the modules can be selected according to actual needs to achieve the purpose of the scheme of embodiments. In addition, in the accompanying drawings provided in embodiments of the present disclosure, a connection relation between the modules is indicated that a communication connection is formed between the modules, which can be specifically realized as one or more communication buses or signal lines. One of ordinary skill in the related art on the premise of no creative work can understand and implement the method above mentioned.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An online measurement method for temperature stability of production layers in an oil and gas well comprising the following steps:

S10, obtaining a plurality of temperature data, using a distributed optical fiber temperature measuring equipment, over time at each position point of an optical fiber inside the oil and gas well, S20, according to the plurality of temperature data, calculating temperature standard deviations of each position point within a production layer of the oil and gas well at a plurality of time points within a preset time period by computer programs implemented by a processor;

S30, performing probability distributions statistics according to the temperature standard deviations at all position points of the production layer at a time point, according to normal distribution by the computer programs; fitting a probability distribution curve of the temperature standard deviations at all position points of the production layer at the time point by the computer programs, and obtaining a probability density function according to the fitted curve by the computer programs;

S40, according to the probability density function, calculating the temperature standard deviations corresponding to at least one value that integral values of the probability density function is between (0, 1) by the computer programs;

S50, repeating the steps S30~S40 to obtain the temperature standard deviations corresponding to the at least one value that the integral values of the probability density function of the temperature standard deviations at all position points of the production layer at each time point is between (0, 1) by the computer programs, segmenting all the position points of the production layer, and generating a standard temperature deviation normal distribution probability time curve of each section of the production layer according to the temperature standard deviations; and S60: determining temperature stability of the production layers using the standard temperature deviation normal distribution probability time curve of each section of the production layer.

2. The online measurement method as claimed in claim 1, wherein a plurality of temperature data at each position point of an optical fiber is obtained by extracting online according to a temperature profile curve measured by the distributed optical fiber temperature measuring equipment.

3. The online measurement method as claimed in claim 1, wherein the Step S60 comprises:

judging whether a temperature of each section of the production layer is stable, according to the standard temperature deviation normal distribution probability time curve of each section of the production layer; if the temperature of each section of the production layer is unstable, repeating the steps S10~S50; if the temperature of each section of the production layer is stable, ending current production operation and entering a next production operation.

4. The online measurement method as claimed in claim 1, wherein the step of according to the plurality of temperature data, calculating temperature standard deviations of each position point within the production layer of oil and gas wells at the plurality of time points within the preset time period by the computer programs performed by the processor, comprises the following steps:

S201, collecting temperature data of one frame of the optical fiber every N seconds by the distributed optical fiber temperature measuring equipment, after collecting data of M frames cumulatively, performing standard deviation calculation on the temperature data at each position point of the optical fiber to obtain standard deviation data of a first frame;

S202, after collecting data of a $(M+1)^{th}$ frame, performing standard deviation calculation on the temperature data at each position point of the optical fiber to obtain standard deviation data of a second frame, by using data of the last $(M-1)^{th}$ frames in the previous M frames and the data of the $(M+1)^{th}$ frame;

S203, performing the step S202 circularly, summarizing the standard deviation data of all frames in the present time period into a frame array of the standard deviation data; and S204, independently extracting data of the production layer in the generated standard deviation data frame array, to obtain the temperature standard deviations of each position point in the production layer of the oil and gas well at the plurality of time points in the present time period, and generating a standard deviation change curve according to the temperature standard deviations.

5. The online measurement method as claimed in claim 1, wherein the fitted curve of the normal distribution is automatically fitted by fitting software.

6. A system comprising a memory, a processor and computer programs stored in the memory and performed by the processor to implement an online measurement method; the method comprising the following steps:

S10, obtaining a plurality of temperature data, using a distributed optical fiber temperature measuring equipment, over time at each position point of an optical fiber inside the oil and gas well, S20, according to the plurality of temperature data, calculating temperature standard deviations of each position point within a production layer of the oil and gas well at a plurality of time points within a preset time period;

S30, performing probability distributions statistics according to the temperature standard deviations at all position points of the production layer at a time point, according to normal distribution; fitting a probability distribution curve of the temperature standard deviations at all position points of the production layer at the time point, and obtaining a probability density function according to the fitted curve;

S40, according to the probability density function, calculating the temperature standard deviations corresponding to at least one value that integral values of the probability density function is between (0, 1);

S50, repeating the steps S30~S40 to obtain the temperature standard deviations corresponding to the at least one value that the integral values of the probability density function of the temperature standard deviations at all position points of the production layer at each time point is between (0, 1), segmenting all the position points of the production layer, and generating a standard temperature deviation normal distribution probability time curve of each section of the production layer according to the temperature standard deviations; and S60: determining temperature stability of the production layers using the standard temperature deviation normal distribution probability time curve of each section of the production layer.

7. A computer readable storage medium configured to store computer programs, the computer programs performed by a processor to implement an online measurement method, the method comprising the following steps:

S10, obtaining a plurality of temperature data, using a distributed optical fiber temperature measuring equipment, over time at each position point of an optical fiber inside the oil and gas well, S20, according to the plurality of temperature data, calculating temperature standard deviations of each position point within a production layer of the oil and gas well at a plurality of time points within a preset time period;

S30, performing probability distributions statistics according to the temperature standard deviations at all position points of the production layer at a time point, according to normal distribution; fitting a probability distribution curve of the temperature standard deviations at all position points of the production layer at the time point, and obtaining a probability density function according to the fitted curve;

S40, according to the probability density function, calculating the temperature standard deviations corresponding to at least one value that integral values of the probability density function is between (0, 1);

S50, repeating the steps S30~S40 to obtain the temperature standard deviations corresponding to the at least one value that the integral values of the probability density function of the temperature standard deviations at all position points of the production layer at each time point is between (0, 1), segmenting all the position points of the production layer, and generating a standard temperature deviation normal distribution probability time curve of each section of the production layer according to the temperature standard deviations; and S60: determining temperature stability of the production layers using the standard temperature deviation normal distribution probability time curve of each section of the production layer.

\* \* \* \* \*